United States Patent [19]

Conroy et al.

[11] Patent Number: 5,232,999
[45] Date of Patent: * Aug. 3, 1993

[54] OLEFIN POLYMERIZATION CATALYST AND PROCESS

[75] Inventors: Brian K. Conroy, Batavia, Ill.; Kenneth R. Farmer, Dewey, Okla.; Ted M. Pettijohn, Bartlesville, Okla.

[73] Assignee: Phillips Petroleum Company, Bartlesville, Okla.

[*] Notice: The portion of the term of this patent subsequent to Apr. 9, 2008 has been disclaimed.

[21] Appl. No.: 826,549

[22] Filed: Jan. 27, 1992

[51] Int. Cl.$^5$ .......................... C08F 4/52; C08F 10/02
[52] U.S. Cl. .................... 526/129; 526/160; 526/352; 526/348.4; 502/152
[58] Field of Search ................. 526/160, 129, 352

[56] References Cited

U.S. PATENT DOCUMENTS

| | | | |
|---|---|---|---|
| 4,665,046 | 5/1987 | Campbell, Jr. | 526/160 |
| 4,668,773 | 5/1987 | Marks et al. | 534/15 |
| 4,942,148 | 7/1990 | Furuhashi et al. | 526/129 |
| 5,066,739 | 11/1991 | Pettijohn et al. | 526/160 |

OTHER PUBLICATIONS

Thompson and Bercaw, *Pure and Applied Chemistry* vol. 56, No. 1, 1–11 (1984).
Thomspon et al, J. Am. Chem. Soc., 109, 203–219 (1987) Maitlis, *Acc. Chem. Res.*, 11, 301–307 (1978).
Watson and Herskovitz, "Homogeneous Lanthanide Complexes as Polymerization and Oligomerization Catalysts: Mechanistic Studies", ACS Symposium Series, 212, 459–479 (1983).
Tilley et al, *Inorg. Chem.*, 20, 3267–3270 (1981).
Watson et al, *Inorg. Chem.*, 20, 3271–3278 (1981).
Ballard et al, *J.C.S. Chem. Comm.*, 994–995 (1978).

*Primary Examiner*—Joseph L. Schoter
*Assistant Examiner*—David Wu
*Attorney, Agent, or Firm*—Edward L. Bowman

[57] ABSTRACT

The compound $(Cp*_2YCl)_2$ wherein $Cp*$ is pentamethylcyclopentadienyl and its preparation and use for the polymerization of olefins is disclosed.

17 Claims, No Drawings

OLEFIN POLYMERIZATION CATALYST AND PROCESS

FIELD OF THE INVENTION

The present invention relates to a compound of yttrium and to the use of such compound in the polymerization of olefins.

BACKGROUND OF THE INVENTION

It is well known that olefins such as ethylene, propylene, and 1-butene can be polymerized in the presence of certain metallic catalysts, a particular class includes the reaction products of certain organometallic compounds and transition metal compounds which can be used to form substantially linear polymers of relatively high molecular weight. Typically such polymerizations are carried out at relatively low temperatures and pressure.

It has been proposed to use certain organolanthanide compounds as olefin polymerization catalysts. Ballard et al in *J. C. S. Chem. Comm.*, pages 994 and 995 (1978) reported that certain alkali bridged complexes of lanthanide metals such as $[(C_5H_5)_2ErCH_8]_2$ and $[(C_5H_4R)_2YCH_3]_2$, would polymerize ethylene. In addition, Thompson and Bercaw in *Pure and Applied Chemistry*, Vol. 56, No. 1, pages 1-11 (1984), disclose that alkyl and hydride derivatives of permethylscandocene could polymerize ethylene. Although these catalysts were active in polymerizing ethylene, their activity was very short lived. Accordingly it was not possible to obtain particularly desirable levels of catalyst productivity using such catalysts.

An object of the present invention is to provide a novel yttrium compound consisting of the compound having the formula $(Cp^*_2YCl)_2$, wherein $Cp^*$ stands for pentamethylcyclopentadiene.

Another object of the present invention is to provide a process for the polymerization of olefins using this novel dimeric yttrium compound.

Other aspects, objects, and advantages of the present invention will be apparent to those skilled in the art having the benefit of the present disclosure.

SUMMARY OF THE INVENTION

In accordance with the present invention, the compound $(Cp^*_2YCl)_2$ is prepared by preparing $Cp^*_2YCl(THF)$ and then subjecting $Cp^*_2YCl(THF)$ to sublimation.

Further in accordance with the invention, there is provided the process for polymerizing olefins comprising contacting the olefin under suitable reaction conditions with the dimeric yttrium compound $(Cp^*_2YCl)_2$.

DETAILED DESCRIPTION OF THE INVENTION

The compound $Cp^*_2YCl(THF)$ can be prepared using any technique known in the art. One technique involves reacting pentamethylcyclopentadiene with sodium hydride by refluxing in tetrahydrofuran. The pentamethylcyclopentadienyl sodium compound resulting from this step is then reacted with yttrium trichloride with a molar ratio of the sodium pentamethylcyclopentadienyl to the yttrium trichloride being about 2 to 1. This reaction can be carried out by refluxing in THF. A purified $Cp^*_2YCl(THF)$ can be obtained by crystallizing the resulting reaction mixture. A typical liquid used for such crystallization would be toluene.

The novel compound $(Cp^*_2YCl)_2$ can be prepared by subjecting solid $Cp^*_2YCl(THF)$ to sublimation under suitable conditions. It is generally found that the sublimation is adequately carried out at a temperature of about 230° C.

This dimeric yttrium compound has been found to be effective for the polymerization of ethylene. It is also, however, within the scope of the present invention to employ other olefinic monomers. Examples of other such monomers include propylene, 4-methyl-1-pentene, butadiene, styrene, 1-hexene, 1-butene, propylene, and allyl trimethylsilane. Surprisingly, it has been found that comonomers which would generally result in ethylene polymers of lower density with transition metal catalysts result in ethylene polymers of higher density. Specifically, the dimeric yttrium compound appears to be selective toward ethylene and is considered to substantially ignore the presence of other alpha-olefins that may be present such as 1-butene, 1-hexene, and the like.

The polymerization is conducted by combining the cyclopentadienyl yttrium dimer with a suitable cocatalyst. Currently preferred cocatalysts are alkali or alkaline earth metal halides. The ratio of the dimer to the alkali or alkaline earth metal halide can vary over a wide range depending upon the particular results desired. Typically, the molar ratio of the alkali or alkaline earth metal alkyl to the yttrium in the dimeric organolanthanide compound will be in the range of from about 0.5:1 to about 20:1, more commonly about 2:1 to about 15:1 and more preferably about 2:1 to about 5:1.

Although the catalyst system resulting from the use of an alkaline earth metal alkyl cocatalyst such as dibutyl magnesium is generally not as active as one resulting from the use of an alkali metal alkyl such as butyllithium, the alkaline earth metal alkyl cocatalyst has advantages when certain results are desired. It produces lower molecular weight polyethylene than the alkali metal alkyl, i.e. MI=6.37 and HLMI=143.28 versus MI=2.06 and HLMI=47.8, under similar polymerization conditions, i.e. 90° C. polymerization temperature. It often allows for easier clean up of the polymerization reactor. It also yields polymer having a desirable particle size distribution which is particularly surprising for a homogeneous catalyst system. Although organoaluminum compounds such as triethylaluminum can be used as cocatalysts, they generally do not result in as active a catalyst system.

The polymerization conditions can vary widely depending upon the particular results desired. The polymerizations can be carried out in either a solution or a slurry type technique. The term "slurry" type polymerization refers to polymerizations in which polymer is product in a solid form that is substantially insoluble at the polymerization conditions. Conventional polymerization diluents can be used in combination with the catalyst system. Some typical examples include aromatic and aliphatic hydrocarbons such as toluene, xylene, hexane, isobutane, ethylbenzene, heptane, cyclohexane, and mineral spirits. Generally, such polymerizations would be carried out at temperatures in the range of about 0° to about 170° C., more preferably generally about 15° C. to about 100° C. A further understanding of the present invention and its benefits and advantages will be provided by the following examples.

In a particularly favored process the dimeric yttrium compound is supported on a suitable support, which generally is insoluble in the polymerization medium. A currently preferred support is 600° C. activated Grade 952 silica obtained from Davidson. The use of the yttrium dimer supported on such silica has enabled the production of polyethylene in a slurry process with greatly reduced polymer fines as compared to the results obtained using unsupported yttrium dimer. One technique involves merely mixing the silica, the yttrium dimer, and the cocatalyst in the polymerization diluent and then carrying out the polymerization.

EXAMPLE I

A series of polymerization runs were conducted employing $(Cp^*_2YCl)_2$. The $(Cp^*_2YCl)_2$ was prepared by refluxing yttrium trichloride and pentamethylcyclopentadienyl sodium in THF and subjecting the resulting solid to sublimation at 230° C. The molar ratio of the yttrium trichoride to the sodium $Cp^*$ compound was 1:2.

A series of polymerization runs were conducted using the $(Cp^*_2YCl)_2$ with butyllithium to polymerize ethylene. The variations in the polymerization processes and the results obtained are summarized in Table 1.

TABLE 1

| | Effects of Hydrogen $(Cp^*_2YCl)_2$/LiBu | | |
|---|---|---|---|
| Hydrogen (psi) | Productivity* | MI | HLMI |
| 0 | 1,875 | 0.04 | 1.10 |
| 20 | 1,251 | 43.1 | High |
| 100 | 2,957 | High | High |

Run Temperature = 80° C. Y:Li = 1:20
*grams of polymer per gram of dimer per hour.

It was noted that the employment of hydrogen increases the life of the catalyst system. The productivity value obtained using 20 psi hydrogen is considered anomalous. For this catalyst system the melt index increased as the amount of hydrogen employed increased. The term "High" indicates that the numbers were too high to record, i.e. lower molecular weight products. Such polymers are often referred to as waxes.

When these results are compared to those obtained using $Cp^*_2YCl(THF)$, it is noted that the dimer is less sensitive to hydrogen than the THF complex, i.e. hydrogen reduces the molecular weight less for the dimeric catalyst than for the THF complex catalyst.

Also without hydrogen the polymer tended to have vinyl end groups whereas with hydrogen more saturated end groups are observed.

EXAMPLE II

Another series of ethylene polymerization runs were carried out using the butyllithium/$(Cp^*_2YCl)_2$ catalyst system using different levels of the yttrium compound and lithium alkyl. In these runs no hydrogen was employed. The results and process variables are summarized in Table 2.

TABLE 2

| Effects of Y:LiBu Ratio[a] $(Cp^*_2YCl)_2$LiBu | |
|---|---|
| Y:LiBu | Productivity (g/g · h)* |
| 1:2 | 40,000[b] |
| 1:5 | 40,000[b] |
| 1:10 | 18,000[c] |
| 1:15 | 15,000[c] |
| 1:20 | 1,000[c] |

[a]90° C., no $H_2$.
[b]50ΔP($C_2H_4$).
[c]200ΔP($C_2H_4$).
*As in Table 1.

These results demonstrate that the productivity tends to decrease as the level of lithium is increased.

EXAMPLE III

Still another series of polymerization runs were carried out using the butyllithium/$(Cp^*_2YCl)_2$ catalyst system. In these runs various polymerization temperatures were employed and no hydrogen was used. The Y:LiBu ratio was 1:2 and the ethylene pressure was 50 psi. The results are summarized in Table 3.

TABLE 3

| Temperature Dependence[a] $(Cp^*_2YCl)_2$/LiBu | | | |
|---|---|---|---|
| Temperature (°C.) | Productivity (g/gY · hr) | MI | HLMI |
| 60 | 8,327 | 0 | 0 |
| 70 | 28,666 | 0 | 0 |
| 80 | 8,984 | 0.04 | 1.10 |
| 90 | 5,160 | 2.06 | 47.8 |
| 100 | 1,541 | 46.1 | High |

[a]No hydrogen.

The results demonstrate that higher temperatures tend to favor the production of lower molecular weight polyethylenes. At a given polymerization temperature the $(Cp^*_2YCl)_2$ catalyst gives a higher molecular weight polyethylene than the related compound $Cp^*_2YCl(THF)$.

EXAMPLE IV

Still another series of polymerization runs were carried out using this catalyst system. 1-Butene or 1-hexene was employed in addition to the ethylene monomer. The polymerizations were carried out at 90° C. and the ratio of the butyllithium to the yttrium was about 20:1. In these runs no hydrogen was employed. The results are summarized in Tables 4 and 5.

TABLE 4

| 1-Hexene (g) | MI | HLMI | Density (g/cc) |
|---|---|---|---|
| 0 | 0.11 | 2.62 | 0.9575 |
| 13 | 0.34 | 6.71 | 0.9608 |
| 20 | 1.59 | 29.81 | 0.9642 |
| 40 | 2.77 | 59.70 | 0.9670 |
| 80 | 3.63 | 58.97 | 0.9642 |
| 100 | High | High | 0.9726 |

TABLE 5

| 1-Butene (g) | MI | HLMI | Density (g/cc) |
|---|---|---|---|
| 0 | 0.11 | 2.62 | 0.9575 |
| 10 | 1.77 | 36.64 | 0.9632 |
| 20 | 3.38 | 75.27 | 0.9632 |
| 40 | 1.39 | 30.19 | 0.9608 |
| 80 | 5.31 | 87.62 | 0.9659 |
| 100 | High | High | 0.9640 |

The data in Tables 4 and 5 demonstrates that the density of the polymer did not decrease when a comonomer such as 1-butene or 1-hexene was employed with the ethylene. This is in contrast to the behavior normally seen with organometallic transition metal polymerization systems. However, the molecular weight as reflected by MI and HLMI did increase.

EXAMPLE V

About 0.026 grams of $(Cp^*_2YCl)_2$ and about 0.52 grams of Davidson Grade 952 silica which had been calcined at 600° C. were added to a polymerization vessel containing about 2 liters of isobutane. About 1 ml of a 0.16 molar solution of butyllithium cocatalyst was added then ethylene was polymerized in the presence of this mixture at a temperature of about 98° C. After 10 minutes the polymerization was stopped by venting the reactor. About 363 grams of wet powdery solid was obtained. After drying, the polymer weighed about 167 grams and had a powdery flour-like consistency.

Similar runs were conducted using higher levels of cocatalyst. The polymerization conducted with higher levels of butyllithium cocatalyst did not yield as much solid polymer per gram of catalyst but often yielded polymer that had a granular consistency rather than a powdery flour-like consistency. For example, a polymerization conducted using about 0.17 grams of $(Cp^*_2YCl)_2$, about 0.1 grams of the calcined Grade 952 silica, and about 5 milliliters of a 1.6 molar solution of butyllithium yielded only about 13.4 grams of wet polymer after 40 minutes of polymerization. The dried polymer was a higher bulk density, granular material which had a total weight of 13.2 grams.

That which is claimed is:

1. A process for polymerizing ethylene comprising contacting ethylene under suitable reaction conditions with a catalyst comprising a catalytic amount of a compound of the formula $(Cp^*_2YCl)_2$ wherein $Cp^*$ is pentamethylcyclopentadienyl and an alkali or alkaline earth metal alkyl cocatalyst.

2. A process according to claim 1 wherein the cocatalyst consists essentially of butyllithium.

3. A process according to claim 2 wherein the molar ratio of the butyllithium to yttrium is in a range of from about 0.5:1 to about 20:1.

4. A process according to claim 3 wherein said $(Cp^*_2YCl)_2$ is supported upon a particulate support.

5. A process according to claim 4 wherein said particulate support consists essentially of silica.

6. A process according to claim 5 wherein the polymerization is conducted in the presence of at least one additional olefin selected from the group consisting of alpha-olefins having at least three carbons per molecule.

7. A process according to claim 6 wherein said additional olefin is selected from the group consisting of 1-butene and 1-hexene.

8. A process according to claim 1 wherein said cocatalyst consists essentially of dibutyl magnesium.

9. A process according to claim 1 wherein each alkyl group of said cocatalyst has 1 to 6 carbons.

10. A process according to claim 9 wherein said cocatalyst consists essentially of an alkali metal alkyl.

11. A process according to claim 1 wherein said $(Cp^*_2YCl)_2$ is supported on particulate silica.

12. A process for polymerizing an olefin comprising charging silica and a catalytic amount of $(Cp^*_2YCl)_2$ wherein $Cp^*$ is pentamethylcyclopentadienyl into a polymerization diluent and then contacting said olefin with the resulting mixture under slurry polymerization conditions.

13. A process according to claim 12 wherein ethylene is polymerized.

14. A process according to claim 13 wherein a cocatalyst is employed which is selected from alkali or alkaline earth metal alkyls in which the alkyl groups have 1 to 6 carbon atoms.

15. A process according to claim 14 wherein the cocatalyst consists essentially of butyllithium.

16. A process according to claim 14 wherein the cocatalyst consists essentially of dibutyl magnesium.

17. A process according to claim 12 wherein said silica has been activated by heating at about 600° C. before being combined with the yttrium compound.

* * * * *